United States Patent [19]

Bergen et al.

[11] Patent Number: 5,564,113
[45] Date of Patent: *Oct. 8, 1996

[54] COMPUTER PROGRAM PRODUCT FOR RENDERING RELATIONAL DATABASE MANAGEMENT SYSTEM DIFFERENCES TRANSPARENT

[75] Inventors: Dianne E. Bergen, Sydney, Australia; Doreen A. Fogle; Harold H. Hall, Jr., both of San Jose, Calif.; Helga T. Spickhoff, Saratoga, Calif.

[73] Assignee: International Business Machines Corporation, Armonk, N.Y.

[ * ] Notice: The term of this patent shall not extend beyond the expiration date of Pat. No. 5,450,581.

[21] Appl. No.: 482,771

[22] Filed: Jun. 7, 1995

Related U.S. Application Data

[62] Division of Ser. No. 320,308, Oct. 11, 1994, Pat. No. 5,450,581, which is a continuation of Ser. No. 876,604, Apr. 30, 1992.

[51] Int. Cl.⁶ .................................................. G06F 17/30
[52] U.S. Cl. ........................ 395/600; 364/DIG. 1; 364/282.3; 364/282.4; 364/282.1
[58] Field of Search .............................................. 395/600

[56] References Cited

U.S. PATENT DOCUMENTS

| | | | |
|---|---|---|---|
| 4,359,286 | 11/1982 | Barnes et al. | 400/70 |
| 4,714,995 | 12/1987 | Materna et al. | 395/600 |
| 4,774,661 | 9/1988 | Kumpati | 395/600 |
| 4,914,586 | 4/1990 | Swinehart et al. | 395/600 |
| 5,181,162 | 4/1990 | Smith et al. | 364/419.17 |
| 5,197,005 | 4/1993 | Shwartz et al. | 364/419.13 |
| 5,202,977 | 4/1993 | Pasetes, Jr. et al. | 395/500 |
| 5,204,897 | 4/1993 | Wyman | 380/4 |
| 5,235,701 | 8/1993 | Ohler et al. | 395/600 |
| 5,249,268 | 9/1993 | Doucet | 395/200 |
| 5,260,999 | 11/1993 | Wyman | 384/4 |
| 5,265,221 | 11/1993 | Miller | 395/725 |
| 5,325,465 | 6/1994 | Hung et al. | 395/63 |
| 5,335,346 | 8/1994 | Fabbio | 395/600 |
| 5,379,419 | 1/1995 | Hefferman et al. | 395/600 |

*Primary Examiner*—Wayne Amsbury
*Attorney, Agent, or Firm*—Sterne, Kessler, Goldstein & Fox P.L.L.C.

[57] ABSTRACT

A computer-implemented method is provided which helps to render the differences between relational database management system (RDBMS) types transparent. The computerized process enables database objects and authorizations on objects, as well as user privileges, to be moved or copied from one RDBMS to another within a distributed relational database environment without requiring a database administrator to have expertise in every RDBMS type in that environment. The computerized process is achieved using three inter-related and inter-dependent tables, a translation table, an implications table and a composition table which are stored in a computer memory and accessed through a computer. These tables provide a mapping matrix between database objects of a plurality of RDBMSs.

15 Claims, 5 Drawing Sheets

FIG. 3

AUTHORIZATION TRANSLATION TABLE (30)

| SOURCE TYPE (40) | SOURCE TARGET LEVEL (41) | SOURCE OBJECT TYPE (42) | SOURCE AUTHORIZATION W/GRANT (43) | TARGET TYPE (44) | TARGET START LEVEL (45) | TARGET OBJECT TYPE (46) | TARGET AUTHORIZATION (47) | TARGET W/GRANT (48/49) | IMPLICATION NUMBER (50) |
|---|---|---|---|---|---|---|---|---|---|
| | | | | | | | | | |

FIG. 4

AUTHORIZATION IMPLICATION TABLE (31)

| IMPLICATION NUMBER (70) | SEQUENCE NUMBER (71) | IMPLICATION CLASS (72) | PRODUCT ID (73) | MESSAGE NUMBER (74) |
|---|---|---|---|---|
| | | | | |

FIG. 5

AUTHORIZATION STATEMENT COMPOSITION TABLE (32)

| DB TYPE (90) | START LEVEL (91) | ACTION (92) | OBJECT TYPE (93) | AUTHORIZATION (94) | VERB (95) | OBJECT PREFIX (96) | OBJECT NAME (97) | PUBLIC TEXT (98) | W/ GRANT (99) | JOIN AUTHS (100) | JOIN USER-IDS (101) | JOIN OBJECTS (102) |
|---|---|---|---|---|---|---|---|---|---|---|---|---|
| | | | | | | | | | | | | |

Verb auth_spec
ON object_prefix "object name"
to_from "auth_id"
with_grant_option

*FIG. 6*

GRANT   SELECT
        INSERT
        DELETE
        UPDATE ( column_name,
                 column_name,
                 column_name )
ON TABLE "table_name"
TO "auth_id"
WITH GRANT OPTION;

*FIG. 7*

COMPUTER PROGRAM PRODUCT FOR RENDERING RELATIONAL DATABASE MANAGEMENT SYSTEM DIFFERENCES TRANSPARENT

This application is a division of application Ser. No. 08/320,308, filed Oct. 11, 1994, U.S. Pat. No. 5,450,581, which is a file wrapper continuation of U.S. patent application Ser. No. 07/876,604, filed Apr. 30, 1992.

FIELD OF THE INVENTION

This invention relates to computer systems having relational database management systems for storing, organizing and retrieving data.

BACKGROUND OF THE INVENTION

In a dynamic business environment, timely access to data is important. Computerized databases are commonly used to store data for easy retrieval and organization. The data is stored electronically in mass storage devices. Computer software programs called database management systems (DBMS) are used to manipulate the data for retrieval, deletion, updates and storage. The DBMS often has a catalog describing the data it manages and it controls the access to the data stored within it. A database administrator (DBA) is responsible for organizing, monitoring and reorganizing the logical database structure.

One type of DBMS used by many enterprises is a relational database management system (RDBMS). An RDBMS is a body of related information stored in a computer organized as tables having columns and rows. The columns correspond to attributes of a relation and rows correspond to a relation grouping called a tuple. For example, an inventory table could have attributes such as: an inventory item number, a description of the item, a quantity in stock, a price and a supplier. Each column corresponds to an attribute, and each row is a tuple comprising the attributes for a given item.

Large enterprises with many remote business locations frequently have data stored at each separate location. For example, a large retail business having numerous outlets many miles away from each other could have separate databases at each location keeping track of that store's inventory.

The local databases are accessible by local sales staffs for information about items in stock locally. However, a central purchasing staff for the business also needs to access the information regarding each store's inventory. Access to remote data for a database user and for a programmer creating programs using the data can be difficult. A greater level of skill on a programmer's part or manual procedures are required to provide the central purchasing staff with the needed information.

Each of the remote locations may be using one of many different RDBMSs that are currently available. These RDBMS types, and each version and release thereof, have different features and functionalities. It is more difficult to access data at a remote location which has a different RDBMS. For large enterprises having many remote locations, a DBA would have to know many different RDBMS type commands, syntax and structure to access or control access to data at each remote site. Therefore enterprises often have a problem of making the differences between RDBMS types transparent to the DBA or end user.

The need for rendering the differences between RDBMS types transparent becomes even more important for enterprises using a distributed relational database network implementing "remote unit of work" (RUOW).

A distributed relational database network consists of a collection of tables spread across a number of computer systems having the same or different types of RDBMSs that are interconnected in a network. Each computer system in the network has its own RDBMS to manage tables locally stored in its environment. Particularly in large enterprises, it may be common for the distributed database network to operate in a heterogeneous environment where remote locations have different RDBMSs. A goal of distributed relational database processing is for each RDBMS to handle requests for data stored in another computer system.

"Remote unit of work" refers to a level of distributed relational database processing wherein transactions that encompass a number of database requests can be processed by a RDBMS. The set of requests within a commit scope for a database constitutes a unit of work. A commit scope refers to a grouping wherein all of the transactions for that grouping are implemented (i.e., committed) only when there is a determination that each of the transactions in that grouping was successfully completed. If one transaction fails then none of the transactions are committed (implemented). Each computer has a relational database system that participates in processing the distributed relational data requests. An application program is able to read and update data at more than one location. However, all the data that the program accesses within a unit of work must be on the same RDBMS.

A distributed relational database system enables an enterprise to have some tables in the remote databases that are exact or partial copies of one another in order to provide flexibility for the user. For example, "extracts" are user-requested copies of tables extracted from one database and loaded into another. The extraction process may be repeated periodically to obtain updated data. An enterprise could use extracts to provide a copy of data infrequently changed at corporate headquarters to each branch location. For example, the extraction process can enable a table listing of income tax rates based on an individual's annual income and number of dependents to be given to each branch location in order to process payroll locally. This data can thus be accessible by a local database user using a familiar RDBMS.

When implementing a distributed relational database environment, DBAs need to be able to distribute data that currently resides in centralized databases to other systems such as departmental systems, local area network servers and workstations. Database objects and authorizations on objects, as well as user privileges, need to be moved or copied from one RDBMS to another.

Authorization statements are used to grant users a variety of access privileges to database objects, the right to create and destroy database objects, the right to grant privileges to other users, and the right to revoke all the foregoing privileges.

The authorization statements are implemented in an RDB (a catalog and all of the data described therein) using a language such as the Structured Query Language (SQL). The authorizations on objects and user privileges which a database has differs from one RDBMS type to the next. There may be a different term used for an authorization in a different RDBMS or the same term may be used, but the term may have a different meaning. There may be some authorizations which one RDBMS supports that are not available in one or more of the other RDBMSs. The authorization statements used to implement the authorization scheme also may differ in terms of commands and syntax between RDBMS types.

Another difference which exists between different RDBMS types is the Data Definition Language (DDL). The DDL statements are used to create, delete and alter database objects and define their characteristics. The DDL creates catalog entries representing the way the data is organized for access through the RDBMS. The RDBMS catalog stores information on the table names and attribute names for the columns of each table. The DDL is not used for obtaining or modifying the data itself. The DDL declaration describes in abstract terms what the physical layout of the database will be. The detailed design of the physical database is created by the RDBMS routines that compile the DDL statements.

The syntax of the DDL statements, and more particularly the key words associated with database objects, differ from one RDBMS type to another. In order to set up a database on a computer system using an RDBMS, the proper DDL statements must be used. Often a DDL statement on one RDBMS will have an equivalent statement on another RDBMS, but the commands and syntax are different. Sometimes the same DDL statements will have different effects in different RDBMS system.

There are many differences in the syntax options and semantics of the DDL and authorization statements of various RDBMSs. When moving or copying database objects and authorizations from one RDBMS to another,-unlike RDBMS in an enterprise database network, mapping of the data definition and authorization options from the source to the target is required in order to generate correct and equivalent copies and to provide information where there are no exact equivalents. This mapping requires a DBA who is thoroughly familiar with both the source and the target RDBMS type and level (version, release and modification).

In order to perform certain systems management tasks in a network or enterprise which has a RUOW (remote unit of work) in a heterogeneous RDBMS environment, an enterprise is likely to be required to find or train DBAs who are thoroughly familiar with the details of each RDBMS type at all the remote locations, or hire a DBA for each RDBMS type. These solutions are unreasonable for companies to implement. A company cannot expect DBAs and other system programmers to have the level of proficiency of knowing each RDBMS that a company has at each branch location linked in a distributed network. Likewise, it is unreasonably expensive for a company to hire additional personnel to handle the database administrative needs.

There is a need for tools that help in the translation of database definitions authorizations from one RDBMS type to another unlike RDBMS without requiring additional DBA expertise or additional DBAs. More particularly, there is a need for automating the arduous translation process for database object definitions and authorizations.

SUMMARY OF THE INVENTION

An objective of the invention is to make the differences which exist among RDBMSs which may be connected in a distributed RDBMS network as transparent to the user-as possible.

In accordance with one aspect of the invention a computerized system is provided for copying at least one authorization or database object definition of a source database to a target database. The source database is stored in the memory of a source computer having a relational database management system for processing data contained in the database. The source computer is in a computer system in communication with a target computer. The target computer has a relational database management system (RDBMS) that is different from the source database management system type. The target RDBMS can be a different type of RDBMS or the same type, but a different version, release or modification.

A source authorization or a source object can be copied. The source authorization can comprise an authority or privilege for a user on an object. There may be differences in the target RDBMS of the authorization terminology or scope of authority provided by the authorization. The database object includes at least one key word relating to the object. The object, such a table, will usually be identical in the RDBMSs, but the key words associated with the object may differ.

Computer implemented mapping means are provided for mapping the source RDBMS authorization or object key word to a corresponding authorization or object key word of the target RDBMS. For each authorization or object in the source RDBMS not having an equivalent authorization or object key word in the second RDBMS, a computer implemented identification means is provided for identifying the implications of matching non-equivalent authorizations or object key words. Computer implemented composition means are provided for composing statements for implementing the corresponding authorization or objects and key words in a command syntax of the target RDBMS.

In one form of the invention, the mapping means comprises a translation table stored in a workstation memory having key values for a plurality of authorizations or objects and key words of a plurality of RDBMSs. The key values reference entries for corresponding authorizations or objects and key words of a plurality of RDBMSs. The workstation accesses the translation table with the source and target RDBMS types (version and release levels) and the source RDBMS's authorization or object and key word and extracts the corresponding authorization or object and key word of the second RDBMS. The identification means comprises the translation table containing an implication number associated with each non-equivalently matched authorization or key word. The implication number is a key to an entry in an implications table stored in the workstation memory. The implications table entries contain information on the implications of using the non-equivalent authorization or key word. This allows a database user to perform a thorough impact analysis before creating the target authorization or object. The composition means comprise a composition table stored in the workstation memory wherein the target RDBMS type and corresponding authorization or object key values are key values for entries for command structures for implementing the corresponding authorization or object in the syntax of the target RDBMS (that is, for composing SQL statement for authorization statements or DDL statements for objects).

It is an object of this invention to provide automation of the process of moving or copying database objects and authorizations from one RDBMS to another unlike RDBMS. This system provides a solution for compatibility problems by automatically generating the correct DDL and authorization statements or their most desirable equivalent for the respective target RDBMS type, version, release and modification. By doing so, it increases the productivity of the enterprise personnel by automating systems management tasks that involve moving database objects and authorizations around the distributed enterprise database network. It helps to decrease the need for additional personnel or personnel skills.

It is an object of the invention to make the differences among RDBMSs, with respect to DDL and authorization statements, transparent to the user by providing automatic mapping of source authorizations and object key words to their correct and most desirable equivalent target authorizations and key words and generating DDL and authorization statements for the target RDBMS without requiring intervention.

It is a further object of this invention to automate the arduous translation process between unlike RDBMS types for database object definitions and authorizations. This invention allows for tailorability and extensibility beyond the boundaries presented.

BRIEF DESCRIPTION OF THE DRAWINGS

FIG. 3 is a schematic diagram of a preferred embodiment of a translation table;

FIG. 4 is a schematic diagram of a preferred embodiment of an implications table;

FIG. 5 is a schematic diagram of a preferred embodiment of a composition table; and FIGS. 6 and 7 are examples of a format for composing authorization statements using a preferred embodiment of the invention.

DETAILED DESCRIPTION OF THE INVENTION

Figure 1:
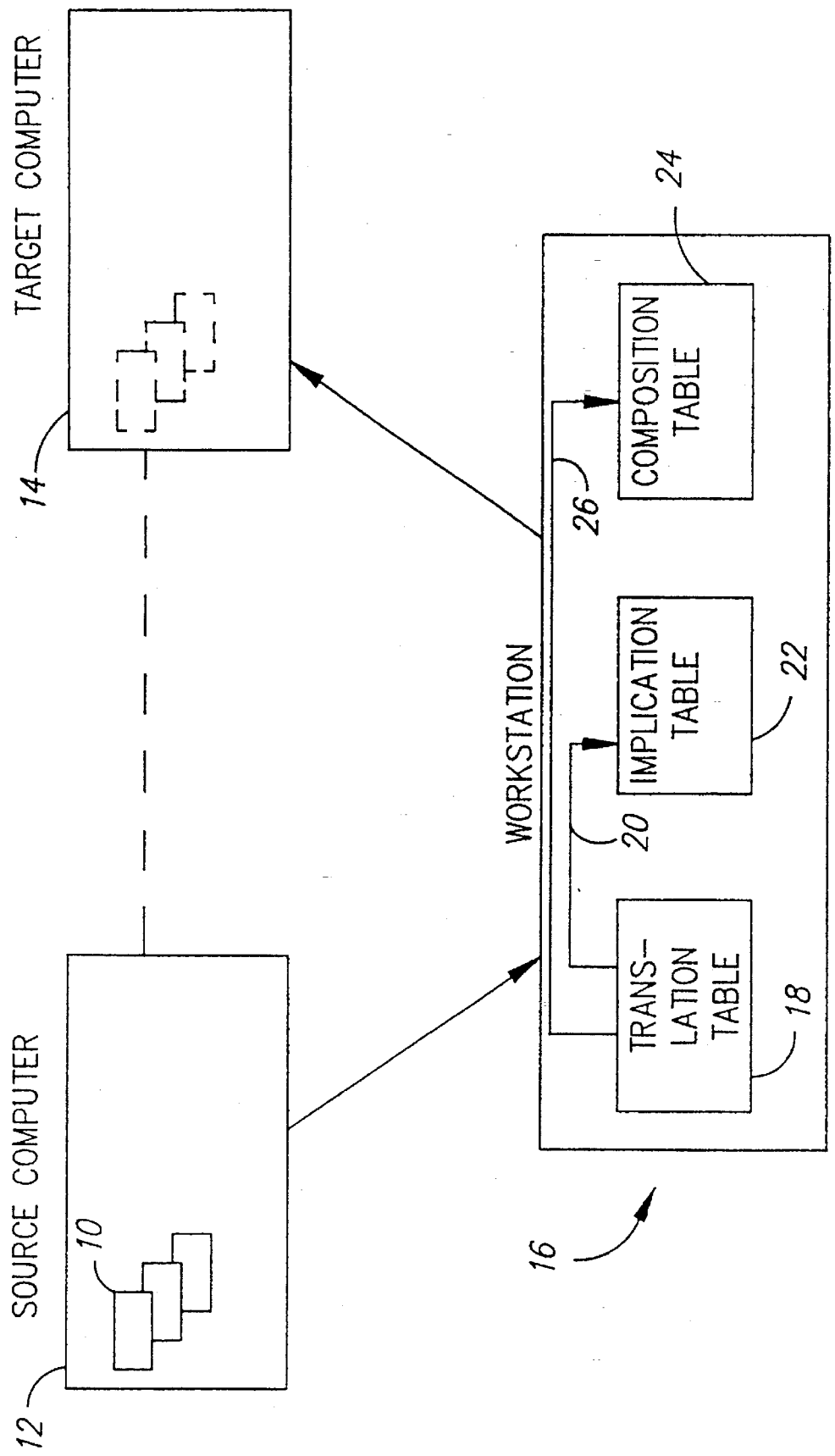
FIG. 1 is a schematic diagram of a distributed relational database network incorporating a preferred embodiment of the invention.

As shown in FIG. 1, in a preferred embodiment, database objects (such as tables 10) as well as authorizations on objects and user privileges can be automatically copied from a source computer 12 to a target computer 14 using a workstation 16. The objects, key words for objects (such as whether an object has a particular option), authorizations on objects and user privileges are stored in a catalog in the source computer. The information that the catalog contains can be used to copy authorizations and objects from the source database to the target database. The authorizations and object key words can have different terminologies, meanings or scopes in different RDBMSs. This invention provides for mapping the values and in generating authorization statements and DDL statements to implement the authorization or object in the target database using the syntax of the target RDBMS.

In a preferred embodiment, the source computer, target computer and workstation are each separate computers with separate memory, processor and data storage devices in communication through a distributed database network. Alternatively, the source, target and workstation can all be part of the same computer. Or, the source and target computers are separate and the workstation is attached to either the source or target computer.

The copying of database objects, authorizations on objects and user privileges from one RDBMS to another unlike RDBMS is achieved using three steps.

First, a database expert's knowledge of every key word or authorization of each RDBMS type, version release and modification level and its equivalent authorization or key word or lack thereof in each of the other RDBMS types down to the version, release and modification level, is referenced by the form of a source-to-target mapping matrix. The mapping matrix is embodied in a translation table 18. For each source authorization or key word to target authorization or key word translation which does not result in a match to an identical function, the implications of the mismatch are investigated and recorded. The implication is recorded in the translation table 18 which provides a pointer 20 to an implication table 22, which contains implication messages which can be output to the DBA or system programmer (or other user needing to copy authorizations or objects). Finally, the appropriate data definition language and/or authorization statements in the syntax of the target RDBMS are composed using the translation table entry. The commands to implement the target DDL or authorization statements are obtained from a composition table 24 using output 26 from the translation table 18.

A database administrator or other programmer, using the workstation 16, is able to generate the commands using the terminology of the target computer RDBMS to copy a database object, an authorization on an object and user privileges from the source database to the target computer. In this way, an entire database, including database objects and authorizations can be copied to a different computer system without the DBA having to be knowledgeable of the statements, functions, or features used by both systems. The DBA has control over the copying process without having to understand both systems, since the implication of using a non-equivalent authorization or object key word in the target RDBMS is explained and the decision whether to use the non-equivalent function can be made by the DBA using this information.

Figure 2A:
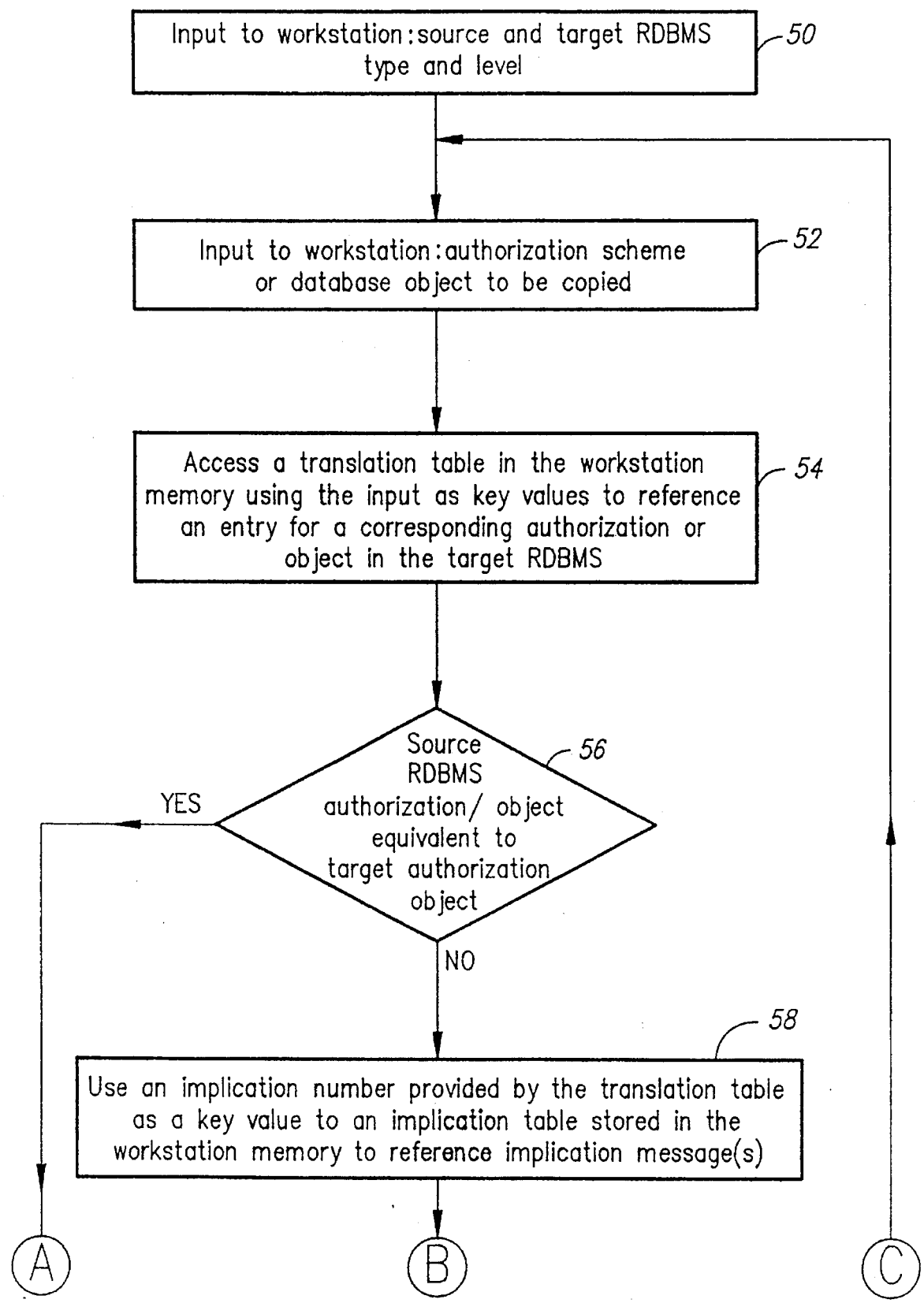
FIG. 2 is a flow chart of a preferred embodiment of the invention.
Figure 2B:
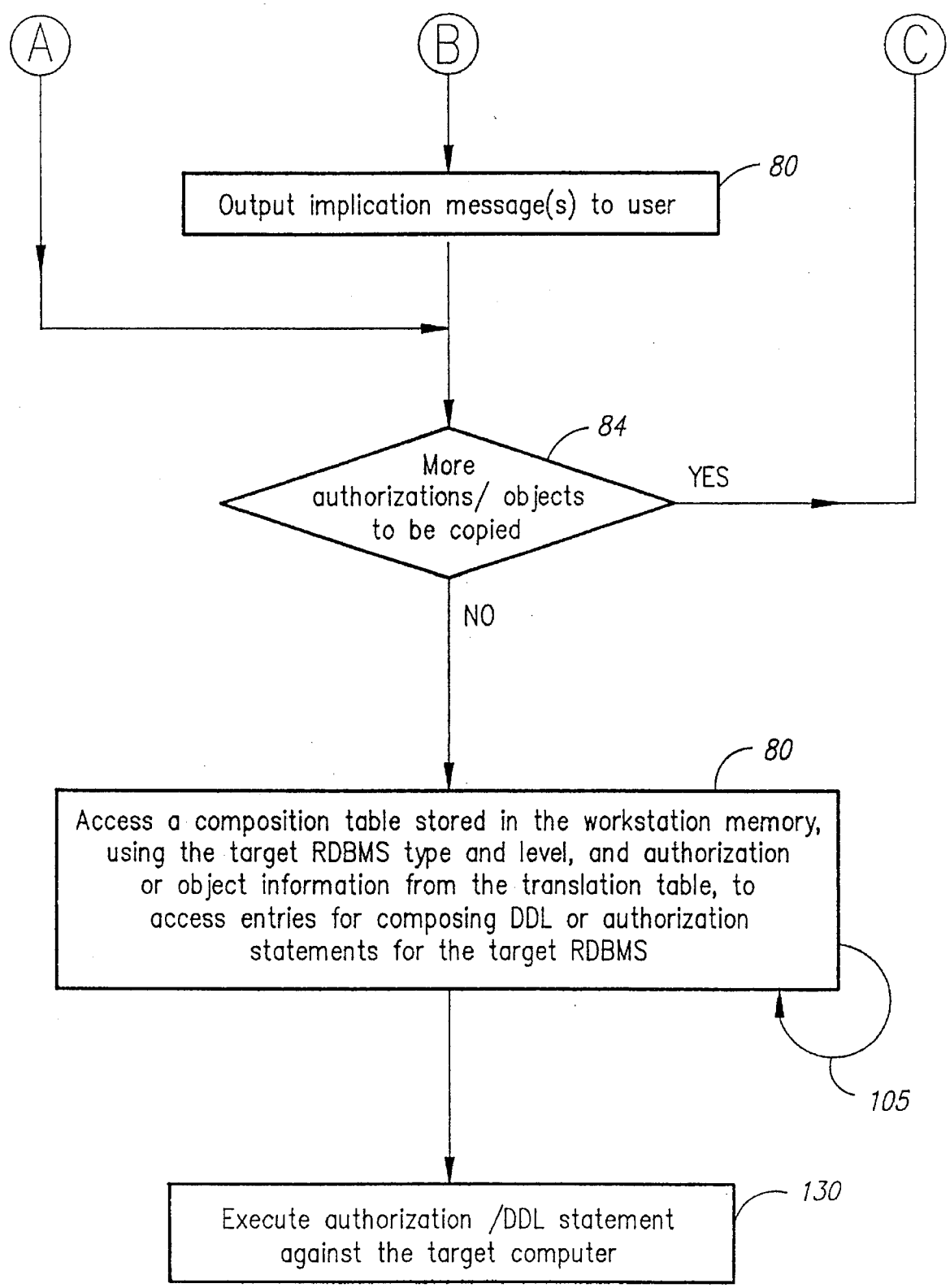

FIG. 2 illustrates an algorithm for the best mode for implementing the invention. The algorithm uses three inter-related and inter-dependent tables: a translation table 30, as shown in FIG. 3; an implications table 31, as shown in FIG. 4; and a composition table 32, as shown in FIG. 5. FIGS. 3 through 5 illustrate tables used for copying authorization (authorizations on objects or user privileges) between unlike RDBMSs. The copying of authorization enables the copying of authorizations held by one user to another user, and the copying of authorizations held by a user on a source object to a target object. The same overall method as described in the flow chart in FIG. 2 can be used for moving and copying database objects and related key words.

The authorization translation table 30 is used to determine which target authorization or authorizations, if any, correspond to a specific source authorization. The source authorization is identified using the source computer catalog.

The authorization translation table 30 contains columns for the source type 40, the source start level 41, the source object type 42, the source authorization 43, whether the source authorization has a grant option 44, the target type 45, the target start level 46, the target object type 47, the target authorization 48, whether the target authorization has a grant option 49, and an implication number 50.

The source and target types, 40 and 47, refer to the RDBMS types of the source and target computers, respectively. The types can be described using three characters to designate one of the commercially available RDBMS types.

The source and target start levels, 41 and 46, determine the version, release, and modification range for which the translation is valid. The closest matching start level which is less than or equal to the level of the RDBMS in question can be used to find the right translation option.

The source authorization 43 is the source authority or privilege that is to be copied. The target authorization 48 is the authorization most closely resembling the source authorization. These can each be described using 12 characters.

The source and target object types, 42 and 47, refer to the object for which the authorization is valid. For example, a table.

The "with grant" options, 44 and 49, indicate whether a specified authorization gives the grantee the added privilege of granting others the same authorization. The "source with grant option" 44 either has a value "Y" or is left blank. If the "source with grant" is blank, then the WITH GRANT OPTION is not specified in the source catalog for the given authorization 43. If the "source with grant" option has the value "Y" then that option is specified in the source catalog for the corresponding authorization 43.

The "target with grant" option 49 indicates whether the WITH GRANT OPTION should be specified for the target authorization 48. The "target with grant" option will have a value of "Y" if the WITH GRANT OPTION should be specified for the target authorization; a value of "N" if it should not, and it will be left blank if the option specified at the source can be used for the target.

If the WITH GRANT OPTION is specified at the source, the selected translation authorization 48 is the entry where the "source with grant" option has a "Y" value (for yes), or is left blank. If the WITH GRANT OPTION is not specified at the source, the selected translation is the entry where the "source with grant" field is left blank or has an "N" (for no). If the target with grant field is "N", the WITH GRANT OPTION clause is not to be added to the generated authorization statement. If the target with grant field has a "Y" or is blank, the WITH GRANT OPTION clause is to be added to the generated authorization statement, but only if the option was specified at the source.

If the source RDBMS does not support the privilege of granting privileges to other users, the value of the "source with grant" field is blank or "N" Similarly, if the target RDBMS does not support the WITH GRANT OPTION clause, the target with grant field must be "N".

The process of automating the transference of authorizations between unlike RDBMSs in order to render differences between the systems transparent is achieved by first providing input to the workstation comprising (see 52 in FIG. 2): the source computer RDBMS type 40, the source computer RDBMS type start level 41, the source authorization 43, the source object type 42, whether the with grant option is valid with the source authorization 44, the target type 45, and the target start level 46.

The input values, 41–46, are used as key values to the translation table 30 stored in the workstation memory to reference entries for a corresponding authorization in the target RDBMS (see 54 in FIG. 2). The corresponding target authorization 48 is identified with reference to the target object type 47 and whether the target authorization has the WITH GRANT OPTION.

The information input to the translation table 30 on source and target RDBMS types and start levels can be obtained from the database RDBMS of the source and target computers. Most RDBMSs have a catalog with the information on the authorizations, including the object type for the authorization and whether the authorization allows others to grant the authorization. This information can be extracted from the source RDBMS catalog to the work station. The information can also be extracted automatically from the source RDBMS which does not maintain catalog.

Whenever there is no target authorization corresponding to a source authorization, the target object type and authorization type fields, 47 and 48, in the table entry are blank. In some cases, one source authorization may map to multiple target authorizations. In these cases, the translation table has one entry for each target authorization to be generated.

Some RDBMSs, but not all, allow update privilege on a table to be restricted to a subset of the columns. This part of the translation can also be driven by the translation table by defining a pseudo-object type of column. The target object type and authorization is blank if this object is not supported by the target RDBMS.

The appearance of the same option or word in the source authorization and target authorization fields, 43 and 48, does not necessarily mean that the effect of the target authorization is identical to the source authorization. Authorizations have often been implemented differently in different RDBMS types. On the other hand, the appearance of a different word in the target authorization does not necessarily imply that the effect of the target authorization is different. The target RDBMS may simply have a different word for the source RDBMS authorization.

Authorization statements in one RDBMS type often will not have an equivalent option in another RDBMS type. In these cases a choice has to be made amongst several similar options, each of which is a different approximation of the desired result, each with its own set of implications and different impact, such as loss of authorization of the target, additional authorization of the target, etc.

When a source RDBMS authorization is not equivalent to a target RDBMS authorization, an implication number 50 is provided by the translation table 30 as a key value to the implication table 31 also stored in the central workstation memory (see 56, 58 in FIG. 2). For example, if an authorization's effect at the target RDBMS is different from the source authorization, an implication number is associated with the mapped authorization.

The implication number 50 is used as key values to reference one or more entries in the implication table 31 of at least one implication of using the non-equivalent authorization in the target RDBMS. The implication information is then output to the DBA, 58, 60. This allows the DBA/user to perform a thorough impact analysis before creating the target authorization. There can be more than one implication for a given source-to-target authorization table. The translation table will contain one implication number for each translation with implications.

Referring to FIG. 4, the authorization implication table 31 contains columns for the implication number 70, sequence number 71, implication class 72, product ID 73 and (one or more) message number(s) 74. The implications table 31 contains at least one entry for each unique implication number used in the authorization translation table 30.

The implication number column 70 is the key field for the implication table 31. The implication number is stored as an integer corresponding to the implication numbers used in the implication number field 50 of the translation table 30.

The sequence number field 71 has integer entries that define the order in which the messages for this implication are to be written.

The implication class field 72 has four-character entries showing the implication class to which the implication belongs. Each implication table provides messages to be generated to inform the user of the implication of a translation mismatch and classifies the implication by class. The user may specify which implication classes are to be reported, thereby selectively suppressing reporting of certain classes of implication messages. The user can enter the class or classes of implications for which information is desired in determining whether to proceed with a non-equivalent translation.

Valid values for the implication class are AUT, DET, NAME and SID. AUT indicates that the implication regards authorization translation. DET indicates that the implication regards details of translation. NAME indicates that the implication regards name changes. SID indicates that the implication regards side effects. The implication class field 72 can also be blank. The user can specify whether the user only wants to know the implication due to translation or details of the translation, or having to do with a change of the name of the object or user, or thing that has to do with a side effect of the authorization translation. When the implication class is blank, the message is to be written regardless of the implications class or classes selected by the user.

The product ID field 73 has three character entries that indicate the product the message is defined for.

The message number field 74 has integer entries that provide the message number to be used by a message facility. The user then can decide whether to proceed with the translation based on the information provided by the implication messages.

The next step in the processes of copying RDBMS authorizations, is composing and generating the RDBMS commands in the syntax of the target RDBMS to implement the authorization 80. This step 80 follows 81 the procedure of identifying implications that exist 58, 60 or follows directly from the translation step 54 when there are no non-equivalent matched authorizations 82.

An authorization composition table 32 is also stored in the central workstation memory. It is used to build the authorization statement using commands in the syntax used by the target RDBMS. The composition table is accessed using the target RDBMS type, action and authorization as key values to access entries for composing command statements syntactically compatible with the target RDBMS. These command statements can then be run against the target computer to implement the authorization in the target RDBMS. Where possible, multiple privileges for the same object and the same authorization ID are combined into one statement 84.

The composition table 32 contains the columns RDBMS type 90, start level 91, action 92, object type 93, authorization 94, verb 95, object prefix 96, object name 97, public text 98, WITH GRANT OPTION 99, join authorizations 100, join user IDs 101 and join objects 102.

The RDBMS type field 90 has three character entries referring to the type of commercially available RDBMS used by the target computer. The start level field 91 has five character entries that indicate the lowest version, release, modification level for which the table entry is valid of the target RDBMS type.

The action column field 92 has one character entries that refer to whether the authorization is being added or copied (having a value of "A") or deleted (having a value of "D"). In a composition table used for composing DDL statements for copying database objects, the action field could also have the value of "C" to designate that the object is to be copied.

The object type field 93 has twenty-character entries that refer to the object for which the authorization applies, such as a table. The authorization field 94 has twelve-character entries that refer to the type of authorization, such as a SELECT authorization. The verb field 95 has twelve-character entries which refer to whether the authorization is being granted or revoked. The object prefix field 96 has twenty-character entries that refer to the object in the target RDBMS, such as a database. The object name field 97 has a one-character ("Y"/"N") to indicate whether the object is to appear in the generated statement.

The public text field 98 has a twenty-five character literal field to be used for public or all users when generating authorizations for public use at-certain database targets. This can be public at all locations for table or view privileges. This can be left blank if the clause is not to appear on the generated statements.

The with grant field 99 has one character ("Y"/"N") entries that indicate whether the WITH GRANT OPTION clause is to appear in the generated statements.

As mentioned before, the authorizations can be combined into one statement for the target RDBMS under certain circumstances 105. All users must be given the same authorizations of the same object in order to combine. The join authorizations, objects and user IDs fields 100–102 have yes/no ("Y"/"N") values as to whether a multiple objects user IDs and authorizations can be combined into one authorization statement. The join authorization column 100 refers to whether the multiple authorizations on this object for the same user can be combined into one authorization statement. The join user IDs column 101 has a yes/no value of whether multiple users can be combined into one authorization statement.

The input to the composition table are values for the RDBMS type 90, the start level 91, the action 92, the object type 93 and the authorization 94. The remaining fields of a row of the composition table for a given key are output from the composition table 32 and used to generate authorization statements as in the form shown in FIGS. 6 and 7. The syntax-of the authorization statement is a language such as SQL. The general format of the authorization statement is shown at 108 in FIG. 6 and an example of a generated SQL statement 109 to add an authorization is shown in FIG. 7.

When building the authorization statement, all trailing spaces are stripped from each component. The statement is generated from components obtained from the composition table.

The verb 110, such as value. GRANT 111, is output from the verb field 95. The auth_spec value 112, such as SELECT, INSERT, DELETE, or UPDATE 113 is output form the authorization column 94. The initial value is the current privilege to be granted. This is compared with the next privilege to be processed to see whether they can be combined into the same statement. If they cannot be combined, or when all privileges have been processed, the authorization specification 112 is complete. The object prefix value 114, such as TABLE 115, is provided from the object prefix field 96 of the table entry when the field is not blank. The object name value 116, such as "table_name" 117, is provided when the object name field 97 from the table has a "Y" value. The to/from component 118 is given the literal value TO 119 if the action is "A". Otherwise, the literal FROM is used.

The auth_id 120 is provided. If the privilege is being granted to the public, the contents of the public text field 98 from the table entry is output in this area. Otherwise, the authorization ID is output.

The with_grant_option 122 has the value of the literal WITH GRANT OPTION 123 when the with grant field 99 from the table entry has a "Y" and the authorization to be composed has the with grant capability, indicating that the WITH GRANT OPTION privilege (of being able to pass on the privilege to others) is being granted.

The complete authorization statements 109 can then be run against the target RDBMS to generate the copy of the authorization from the source RDBMS (see 130 in FIG. 2).

The same types of tables that are used to generate the authorizations can also be used to copy or delete objects from a target computer using the syntax of the languages of the source computer. The invention has the flexibility of being used with any relational database RDBMS by adding the appropriate table entries to the tables. In addition, the tabular approach allows users to easily replace the translation option with preferred installation options. In that way the differences of the RDBMS can be rendered transparent to a user.

When implementing a distributed relational database environment in an information system shop, users need to be able to distribute data that currently resides in centralized databases to other systems such as departmental systems and local area network servers and workstations. Database objects and authorizations on objects, as well as user privileges, need to be moved or copied from one RDBMS to another. This requires tools that help in the translation of database definition and authorization statements from RDBMS to another unlike without requiring additional DBA expertise or additional DBAs. This invention automates this arduous translation process for database object definitions and authorizations. This invention allows for tailorability and extensibility beyond the boundaries presented.

We claim:

1. A computer program product for use with one or more database management systems, said computer program product comprising:

a computer usable medium having computer readable program code means embodied in said medium for establishing at least one target authorization to a target database derived from at least one source authorization to a source database the source database being in communication with the target database and a workstation, the source database, target database, and workstation being in a computer system having a processor, memory, and data storage device, said source database using a source database management system that is different from a target database management system used by the target database, said computer readable program code means comprising:

computer readable program code means for causing a computer to map said source authorization to a corresponding target authorization of said target database management system;

computer readable program code means for causing a computer to identify at least one implication for said source authorization having a corresponding target authorization having non-identical function to said source authorization; and computer readable program code means for causing a computer to automatically compose at least one authorization statement for implementing said corresponding target authorization in a syntax of said target database management system.

2. The computer program product of claim 1, wherein said computer readable program code means for causing a computer map further comprises:

computer readable program code means to cause a computer to store a translation table in said memory, said translation table having authorization key values for a plurality of authorizations of a plurality of database management systems, said authorization key values referencing entries for corresponding authorizations of other ones of said plurality of database management systems, wherein said source authorization and a source type of said source database management system and a target type of said target database management system are used as key values for said translation table.

3. The computer program product of claim 2, wherein said computer readable program code means for causing a computer to identify further comprises:

computer readable program code means to cause a computer to associate an implication number with each corresponding target authorization having non-identical function in said translation table, said implication number being a key to an implication table entry in an implication table stored in said memory, said implication table entry containing information on the at least one implication of using said corresponding target authorization having non-identical function.

4. The computer program product of claim 3, wherein said computer readable program code means for causing a computer to compose further comprises:

computer readable program code means for causing a computer to store a composition table in said memory, wherein said target type and target authorization are keys to at least one entry for causing said computer to compose said at least one authorization statement in the syntax of said target database management system.

5. The computer program product of claim 4, wherein said source database is stored in a source computer and said target database is stored in a target computer separate from said source computer, each of said source and target computers having a separate memory, processor and data storage device.

6. In a computer system, including a source database management system communication with a target database management system and a workstation, the computer system comprising at least one computer having a processor, memory, ant a data storage device, and having a source and target database stored in the storage device, each of the source and target database management systems processing data contained in the respective source and target database, wherein the target database management system is different from the source database management system, a program storage device readable by a machine, tangibly embodying a program of instructions executable by the machine to perform method steps for establishing at least one target authorization to said target database, said target authorization derived from at least one source authorization to said source database, said method steps comprising:

(a) providing information, to said workstation, representing a source type of said source database management system, a target type of said target database management systems, and said source authorization;

(b) accessing a translation table stored in a workstation memory, using said information as translation key values to said translation table, said translation key values referencing an entry for a corresponding target authorization in said target database management system;

(c) accessing, when said corresponding target authorization is non-identical in function to said source authorization, an implication table stored in said workstation memory using an implication number provided by said translation table as an implication key value to said implication table, said implication key value referencing an entry for a message of at least one implication of using said non-identical target authorization; and (d) accessing a composition table stored in said memory using said target type and corresponding target authorization as key values to access entries for components of an authorization statement in the syntax of said target database management system.

7. The program storage device of claim 6 wherein said information comprises the source type, a lowest level of release, an object type authorization, the target type and a target level of release.

8. The program storage device of claim 6 wherein said translation table contains an entry for each corresponding target authorization to be generated when said source authorization corresponds to a plurality of target authorizations.

9. The program storage device of claim 6 wherein said source database is stored in a separate source computer and said target database is stored in a separate target computer, said source and target computers each having a separate processor, memory and data storage device.

10. In a computer system, including a source computer in communication with a target computer and a workstation computer, the source, target and workstation computers each having a processor, memory, and a data storage device, the source and target computers each having a database stored in the storage device and a relational database management system for processing data contained in the database, the target computer having a different target database management system from the source database management system, a program storage device readable by a machine, tangibly embodying a program of instructions executable by the machine to perform method steps for copying at least one source database object to the target database, said method steps comprising:

(a) providing input to said workstation comprising a source type of said source data management system and a target type of said target database management system and said source database object and a source database object key word;

(b) accessing a translation table stored in said workstation memory, using said input as key translation values to said translation table, said translation key values referencing an entry for a corresponding target database object and a corresponding target database object key word in said target database management system;

(c) when said corresponding target key word is non-equivalent to said source key word, accessing an implication table stored in said workstation memory using an implication number provided by said translation table as an implication key value to said implication table, said implication key value referencing an entry for a message of at least one implication of using said non-equivalent target key word;

(d) accessing a composition table stored in said workstation memory using said target type and corresponding target database object and target key word as key values to access entries for components of a data definition language statement in a syntax of said target database management system;

(e) automatically, composing said data definition language statement from said entries accessed from said composition table; and (f) executing said data definition language statement so composed, to copy said source database object to said target database.

11. A computer program product for use in a database management system, said computer program product comprising:

a computer usable medium having computer readable program code means embodied in said medium for copying a database object from a source database to a target database, wherein said target database may differ from said source database in an authorization scheme for database objects and in authorization statements used to implement the authorization scheme, said computer program code means comprising:

computer readable program code means for causing a computer to store a translation table for mapping a plurality of source authorizations of said source database to a plurality of target authorizations of said target database;

computer readable program code means for identifying, from said translation table, a corresponding target authorization mapped to one of said source authorizations associated with a source database object to be copied to said target database;

computer program readable code means for causing a computer to store a composition table for automatically composing at least one authorization statement for implementing said corresponding target authorization in a syntax of said target database; and computer readable program code means for copying said source database object from said source database to said target database.

12. A computer program product for use in a database management system, said computer program product comprising:

a computer usable medium having computer readable program code means embodied in said medium for copying a database object from a source database to a target database, wherein said target database may differ from said source database in a syntax of data definition language statements used to create, delete and alter database objects and to define characteristics of database objects, and wherein said target database may differ from said source database in at least one key word associated with at least one database object, said computer readable program code means comprising:

computer readable code means for causing a computer to store a translation table for mapping a plurality of source database objects and a plurality of source key words of said source database to a plurality of target database objects and a plurality of target key words of said target database;

computer readable program code means for identifying, from said translation table, a corresponding target database object and target key word mapped to one of said source database objects to be copied to said target database;

computer readable program code means for causing a computer to store a composition table for automatically composing, for said corresponding target database object and target key word, at least one data definition language statement, in a syntax of said target database; and computer readable program code means for executing said at least one data definition language statement to copy said one of said source database objects to said target database.

13. A computer program product for use in a database management system, said computer program product comprising:

a computer usable medium having computer readable program code means embodied in said medium for copying a database object from a source database to a target database, wherein said target database may differ from said source database in an authorization scheme for database objects and in authorization statements used to implement the authorization scheme, wherein said target database may differ from said source database in a syntax of data definition language statements used to create, delete and alter database objects and to define characteristics of database objects, and wherein said target database may differ from said source database in at least one key word associated with at least one database object, said computer readable code means comprising:

computer readable code means for causing a computer to store a translation table for mapping a plurality of source authorizations of said source database to a plurality of target authorizations of said target database, and for mapping a plurality of source database objects and a plurality of source key words of said source database to a plurality of target database objects and a plurality of target key words of said target database;

computer readable code means for identifying, from said translation table, a corresponding target authorization mapped to one of said source authorizations associated with a source database object to be copied to said target database, and a corresponding target database object and target key word mapped to said source database object to be copied to said target database; and computer readable code means for causing a computer to store a composition table for automatically composing at least one authorization statement for implementing said corresponding target authorization in a syntax of said target database, and for automatically composing, for said corresponding target database object and target key word, at least one data definition language statement, in a syntax of said target database; and computer readable program code means for executing said at least one data definition language statement to copy said source database object to said target database.

14. A program storage device readable by a machine, tangibly embodying a program of instructions executable by the machine to perform method steps for copying a database object from a source database to a target database, wherein said target database may differ from said source database in an authorization scheme for database objects and in authorization statements used to implement the authorization scheme, said method steps comprising:

accessing a translation table for mapping a plurality of source authorizations of said source database to a plurality of target authorizations of said target database;

identifying, from said translation table, a corresponding target authorization mapped to one of said source authorizations associated with a source database object to be copied to said target database;

accessing a composition table for automatically composing at least one authorization statement for implementing said corresponding target authorization in a syntax of said target database; and copying said source database object from said source database to said target database.

15. A program storage device readable by a machine, tangibly embodying a program of instructions executable by the machine to perform method steps for copying a database object from a source database to a target database, wherein said target database may differ from said source database in a syntax of data definition language statements used to create, delete and alter database objects and to define characteristics of database objects, and wherein said target database may differ from said source database in at least one key word associated with at least one database object, said method steps comprising:

accessing a translation table for mapping a plurality of source database objects and a plurality of source key words of said source database to a plurality of target database objects and a plurality of target key words of said target database;

identifying, from said translation table, a corresponding target database object and target key word mapped to one of said source database objects to be copied to said target database;

accessing a composition table for automatically composing, for said corresponding target database object and target key word, at least one data definition language statement, in a syntax of said target database; and executing said at least one data definition language statement to copy said one of said source database objects to said target database.

* * * * *